United States Patent [19]

Briggs

[11] Patent Number: 4,773,957

[45] Date of Patent: Sep. 27, 1988

[54] BONDING METHOD EMPLOYING NOVEL METHACRYLATE BASED ADHESIVE COMPOSITIONS

[75] Inventor: Paul C. Briggs, Danvers, Mass.

[73] Assignee: Illinois Tool Works, Inc., Chicago, Ill.

[21] Appl. No.: 53,586

[22] Filed: May 19, 1987

Related U.S. Application Data

[60] Continuation of Ser. No. 736,036, May 20, 1985, abandoned, which is a division of Ser. No. 534,918, Sep. 22, 1983, Pat. No. 4,536,546.

[51] Int. Cl.$^4$ .............................................. B32B 7/00
[52] U.S. Cl. .................................. 156/310; 156/332; 156/333; 525/76
[58] Field of Search ................ 156/310, 333, 332; 525/76

[56] References Cited

U.S. PATENT DOCUMENTS

| | | | |
|---|---|---|---|
| 4,106,971 | 8/1978 | Briggs et al. | 156/310 |
| 4,182,644 | 1/1980 | Briggs et al. | 156/310 |
| 4,287,106 | 9/1981 | Forgo et al. | 525/256 |

Primary Examiner—John J. Gallagher
Attorney, Agent, or Firm—Herbert P. Price

[57] ABSTRACT

A novel methacrylate-based composition is disclosed. The composition is preferably used as an adhesive. The composition comprises an acrylate-based or methacrylate-based ester monomer, a catalyst, a chlorinated or chlorosulfonated polyethylene polymer resin and a graft co-polymer resin. The chlorinated polyethylene polymer resin used includes organic sulfonyl chloride. The composition preferably further includes an acrylate-based or methacrylate-based acid monomer, and a catalyst activator. A preferred chlorosulfonated polyethylene polymer resin contains about 43 weight percent chlorine, about 1.1 weight percent sulfur, and about 34 millimoles sulfonyl chloride moiety per 100 grams thereof. Preferred graft co-polymer resins are ABS, MBS, MABS, ASA, all-acrylic, SA EPDM and MAS. More-preferred graft co-polymer resins are MABS, ASA, all-acrylic and MBS. Most-preferred graft co-polymer resins are MABS and ASA. A preferred methacrylate-based acid monomer is methacrylic acid. Preferred methacrylate-based ester monomers are methyl methacrylate, ethyl methacrylate, butyl methacrylate, cyclohexyl methacrylate, 2-ethylhexyl methacrylate and tetrahydrofurfuryl methacrylate. More-preferred methacrylate-based ester monomers are methyl methacrylate and ethyl methacrylate. A most-preferred methacrylate-based ester monomer is methyl methacrylate. The composition possesses enhanced compression shear strength, lap shear strength, peel strength and impact strength adhesive physical properties.

14 Claims, No Drawings

BONDING METHOD EMPLOYING NOVEL METHACRYLATE BASED ADHESIVE COMPOSITIONS

This is a continuation of copending application Ser. No. 736,036, filed May 20, 1985 (now abandoned) which is a divisional of copending application, Ser. No. 534,918, filed Sept. 22, 1983, now U.S. Pat. No. 4,536,546.

BACKGROUND OF THE INVENTION

This invention is directed to novel acrylate-based or methacrylate-based compositions which are preferably used as adhesives. More particularly, this invention is directed to novel methacrylate-based compositions which include relative effective amounts of chlorosulfonated polyethylene and graft polymers for substantially enhancing overall adhesive properties of the compositions.

A variety of patents (for example, U.S. Pat. Nos. 3,890,407 and 4,112,013 to Briggs, Jr. et al, 4,118,436 to Craven, 4,126,504 to Wolinski et al, 4,127,699 to Aumiller et al, 4,182,644 to Briggs, Jr. et al, 4,223,115 to Zalucha et al, 4,226,954 to Pelosi, 4,263,419 to Piestert et al, and 4,293,665 to Zalucha et al) teach generally that acrylate-based or methacrylate-based adhesives can be obtained from mixtures which include effective amounts of chlorosulfonated polymethylene. Briefly put, of the above-mentioned patents which disclose adhesive compositions, adhesive physical properties of such compositions are described either in terms of lap shear strength, or T-peel strength, or both. Some of these patents, moreover, specifically teach that other adhesive properties or preparative features of the therein disclosed compositions can otherwise become enhanced (for example, substantially no premixing of composition ingredients being necessary prior to use thereof; or relatively fast setting of the composition, and strong durable bonds being formed; or adhesion to oily metal surfaces) through inclusion of chlorosulfonated polyethylene therein.

As the following terms are used throughout this application, acrylate-based adhesives are based upon the chemical structure:

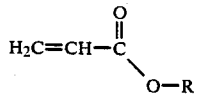

and methacrylate-based adhesives are based upon the chemical structure:

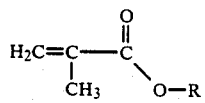

When R is hydrogen, for example, the acrylate-based and methacrylate-based adhesives are based upon acrylic acid and methacrylic acid respectively; or, when R is a methyl group, the acrylate-based and methacrylate-based adhesives are based upon methyl acrylate and methyl methacrylate respectively.

Graft Co-polymers

Polymers comprising relatively long sequences or chains of at least two different monomers or monomeric units can have such chains linked together in a "block" or "graft" arrangement. A block arrangement is linear and is formed from at least two alternating monomeric units. The block arrangement, moreover, can further be formed from monomeric unit sequences which alternate (or repeat) in either an ordered or a random fashion. See U.S. Pat. No. 4,332,858 to Saitoh et al. Block or graft polymers are often referred to as co-polymers, terpolymers or multi-component polymers.

In the graft arrangement, one or more of such sequences are grafted onto a backbone of yet another sequence, such grafting usually taking place at each one of a plurality of grafting sites of the backbone. See, for example, *Textbook of Polymer Science*, 2nd Edition, by F. W. Billmeyer, Jr., published by Wiley-Interscience, a Division of John Wiley and Sons, Inc. (1971), at pp. 350-351. In the graft co-polymer art, when the backbone is a rubber or a rubber-like material and the grafted sequences are vinyl or acrylate- or methacrylate-based monomers, the backbones are often referred to as the "core" of the graft co-polymer. Sequences grafted onto the core form a "shell" around the core.

Such graft co-polymers, frequently referred to as resins, often take the form of a plurality of relatively small particles, especially when the rubber or rubber-like material or the grafted portions or both of these are crosslinked. Not all graft co-polymer resins have such a core-and-shell configuration (or morphology), however. Some, for example, may have a more continuous (i.e., homogeneous) microstructure which, quite often, takes the form of interpenetrating (yet distinct) polymer networks.

Graft co-polymer resins which have the core-and-shell configuration are currently primarily used as modifiers in certain polymer systems. For example, certain ABS (acrylonitrile-butadiene-styrene) or MBS (methacrylate-butadiene-styrene) resins, when added to PVC (polyvinyl chloride), are well-known impact-resistance or processability modifiers.

Graft-co-polymers, per se, are generally not added to adhesive compositions to augment or enhance the adhesive qualities thereof. For example, although U.S. Pat. No. 3,870,675 to Kusayama et al teaches (at column 2, lines 6-27) that an acrylate-based or methacrylate-based adhesive composition can include an ABS resin, the ABS resin therein is included primarily because of its rubber-like characteristics. Certain types of ABS resin, moreover, are well known rubber-like materials and, accordingly, are often used interchangeably with other rubber-like materials. Such types of ABS resin, furthermore, are known to be two-phase systems comprising inclusions of a rubber or a rubber-like phase in a continuous, glassy phase, wherein the continuous phase forms a matrix for the two-phase system. It is further well known that obtaining preferred rubber-like qualities, as to such types of ABS resin, requires selectively grafting, as between the continuous and rubber or rubber-like phases thereof. See, for example, *Textbook of Polymer Science*, cited above, at page 408. The '675 patent, accordingly, further mentions other compositions wherein other rubber or rubber-like materials have been substituted for ABS. (In the '675 patent, see column 2, lines 15-19 in connection with column 3, lines 42-45 and column 6, Table 3.) The adhesive compositions of the '675 patent have adhesive properties (such as, for example, tensile strength after contact, shear strength and impact strength) which render the '675 adhesives substantially different (e.g., as to application or use) from the chlorosulfonated polyethylene-based compositions mentioned above.

Yet another patent, U.S. Pat. No. 4,287,106 to Forgo et al, discloses an acrylate-based or methacrylate-based adhesive composition including ABS polymers (see column 2, lines 33–48), but specifically teaches away from inclusion therein of chlorosulfonated polyethylene (column 1, lines 14–34 in connection with: column 1, lines 57–68; column 2, lines 1–32; column 8, lines 41–56; and column 9, lines 50–64). More specifically, the '106 patent teaches that a chlorosulfonated amide or imide, instead of chlorosulfonated polyethylene, produces an adhesive composition having certain desirable adhesive qualities or properties.

Up until the present time, moreover, it was thought that addition of rubber or rubber-like polymers, such as ABS, to acrylate-based or methacrylate-based adhesive compositions would enhance a first class (or group) of adhesive properties of the compositions, but that further addition (or inclusion) of an additional ingredient (or component) such as, for example, a chlorosulfonated polyethylene (so as to enhance a second class or group of adhesive properties of the composition) would probably render relatively less effective the first group of adhesive properties or would otherwise undesirably affect the overall adhesive performance of the composition. The '106 patent to Forgo, discussed above, accordingly, specifically teaches away from such a combined inclusion of ABS polymers and chlorosulfonated polyethylene in an acrylate-based or methacrylate-based adhesive composition.

OBJECTS AND SUMMARY OF THE INVENTION

It is therefore a general object of this invention to provide a novel methacrylate-based adhesive composition.

A more specific object is to provide such an adhesive composition which includes relative effective amounts of chlorosulfonated polyethylene resin and a graft co-polymer for substantially enhancing overall adhesive qualities or properties of the composition.

A yet more specific object is to provide such a composition having relatively high compression shear strength (i.e., provides relatively strong adhesive bonds as between most plastic materials), lap shear strength (i.e., provides relatively strong adhesive bonds as between most metallic materials), peel strength and impact strength, which, in turn, can generally be understood to mean that such composition possesses substantially enhanced overall adhesive qualities or properties.

A related object is to provide methods of bonding surfaces together using the adhesive composition of the present invention.

Briefly, and in accordance with the foregoing objects, a novel methacrylate-based adhesive composition according to the present invention comprises an acrylate-based or methacrylate-based ester monomer, a catalyst and relative effective amounts of a chlorinated or chlorosulfonated polyethylene polymer resin and a graft co-polymer resin for substantially enhancing overall adhesive qualities or properties of the composition.

DETAILED DESCRIPTION OF THE PREFERRED EMBODIMENTS

The composition of the present invention can comprise an acrylate-based ester monomer. Preferably, however, the composition comprises a methacrylate-based ester monomer. Such a methacrylate-based ester monomer is preferably selected from the group consisting of methyl methacrylate, ethyl methacrylate, butyl methacrylate, cyclohexyl methacrylate, 2-ethylhexyl methacrylate, and tetrahydrofurfuryl methacrylate. Still more preferably, the methacrylate-based ester monomer is selected from the group consisting of methyl methacrylate and ethyl methacrylate. Most preferably, the methacrylate-based ester monomer is methyl methacrylate.

In certain instances it is desirable that the methacrylate-based ester monomer include an effective amount of an inhibitor for inhibiting or otherwise preventing polymerization of the ester monomer. For example, below-presented examples of the composition of the present invention, which therein included methyl methacrylate ester monomer, generally contained from about 50 to about 90 parts per million (ppm) of hydroquinone in the ester monomer as such an inhibitor. Throughout this application the term ppm is based on total weight of the named material. In this sense, the term translates into inclusion of from about 50 to about 90 pounds of hydroquinone per million pounds of ester monomer, the monomer weight being based upon methyl methacrylate and including the hydroquinone.

The composition can further include an acrylate-based acid monomer such as acrylic acid. Inclusion of an acid monomer, however, is entirely optional. In certain instances it may be desirable to exclude use of the acid monomer. See, for example, below-presented discussion which is directed to explanation of example VI. Preferably, however, the composition further includes methacrylic acid. Such methacrylic acid, moreover, in below-presented examples (of the compositions of the present invention), generally contained, for reasons discussed immediately above, about 250 ppm of hydroquinone in the acid monomer as an inhibitor.

The composition further includes a catalyst. For purposes of the present invention, the term "catalyst" means a free-radical generator. As discussed in the above-cited U.S. Pat. No. 4,112,013 at column 2, lines 23–24 thereof, such a free-radical generator can be an organic peroxide, an organic hydroperoxide, a perester, or a peracid. As is well known in the field of acrylate-based and methacrylate-based compositions, such a catalyst is used for triggering polymerization of acrylate-based and methacrylate-based monomers. A preferred catalyst, appearing in below-presented examples of the compositions of the present invention, is cumene hydroperoxide, a free-radical generating organic hydroperoxide.

The composition additionally includes either chlorinated or chlorosulfonated polyethylene polymer resin. It is known (see, for example, U.S. Pat. No. 3,890,407), that chlorinated polyethylene can be substituted for chlorosulfonated polyethylene. When chlorinated polyethylene is substituted, however, organic sulfonyl chloride is preferably further included.

Preferably, however, the composition of the instant invention includes chlorosulfonated polyethylene polymer, the resin which, in turn, preferably contains from about 25 to about 70 weight percent chlorine and from about 3 to about 160 millimoles of sulfonyl chloride moiety per 100 grams thereof. Such polymer resin is described more fully in the above-cited patents (i.e., U.S. Pat. Nos. 3,890,407, 4,112,013 and 4,182,644) which are hereby incorporated herein by reference.

Briefly paraphrasing these patents, the polyethylene from which the chlorosulfonated polyethylene is prepared should have a melt index of from about 4 to about 500. A preferred chlorosulfonated polyethylene polymer resin is prepared from branched polyethylene and has a chemical structure resembling the structure:

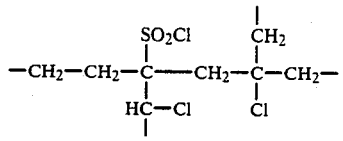

One such preferred chlorosulfonated polyethylene polymer resin, marketed under the trademark "HYPALON 30" is currently commercially available from E. I. Du Pont de Nemours & Company of Wilmington, De., 19898. The "HYPALON 30" brand of chlorosulfonated polyethylene polymer resin, more specifically, is known to contain about 43% by weight chlorine and about 34 millimoles of sulfonyl chloride moiety per 100 grams of polymer resin, is known to be made from branched polyethylene having a melt index of about 100, and is known to have certain other physical properties, such as those properties outlined in Table I. See also, for example, the U.S. Pat. No. 4,226,954 to Pelosi, which is herein incorporated by reference.

Table I-A, presents other preferred varieties of chlorosulfonated polyethylene (CSPE). These varieties, sold under the "HYPALON" trademark, are currently commercially available from E. I. Du Pont de Nemours & Co. Use of these other varieties (or types) of chlorosulfonated polyethylene will be presented below in connection with example VII.

Of the preferred varieties of chlorosulfonated polyethylene presented herein, however, HYPALON 30 is the most-preferred variety thereof.

TABLE I

| | |
|---|---|
| Chlorine Content, Weight % | 43 |
| Sulfur Content, Weight % | 1.1 |
| Specific Gravity | 1.27 |
| Mooney Viscosity at 100 degrees C [212 degrees F] | 30 |
| Brookfield Viscosity, mPa · s[cP] | |
| 25 wt % in toluene | 400[400] |
| 5 wt % in xylene | 4[4] |

TABLE 1-A

| "HYPALON" CSPE Type | 20 | LD-999 | 48S |
|---|---|---|---|
| Chlorine content, weight % | 29 | 35 | 43 |
| Sulfur content, weight % | 1.4 | 1.0 | 1.0 |
| Specific gravity | 1.12 | 1.18 | 1.26 |
| Mooney viscosity at 100° C. [212° F.] | 28 | 30 | 62 |
| Brookfield viscosity, mPa-S [cP] | | | |
| 25 wt % in toluene | 1300[1300] | — | — |
| 5 wt % in xylene | 9[9] | 18[18] | 12[12] |

The composition also preferably includes a catalyst activator (or initiator). Throughout this application, the terms "activator" or "initiator" are used interchangeably and generally mean an aldehyde-amine condensation product, organic sulfonyl chlorides or mixtures thereof. For example, such a condensation product can be made from butyraldehyde and a primary amine, such an amine being, for example, aniline or butylamine.

On the other hand, certain well known catalysts (e.g. heat-activatable peroxides or azodiisobutyronitrile), when heated above room temperatures to induce their decomposition, are known to catalyze (without the preferred catalyst activators being present), thereby causing polymerization of the monomers; and inclusion (in the composition) of catalyst activators (or initiators) is therefore not crucial. However, certain well known promotors (e.g. cobalt, copper and other transition metal compounds) are often added to aid heat induced peroxide decomposition.

Furthermore, ultraviolet light and other forms of radiant energy may be used instead of heat to induce polymerization in the absence of the preferred activators. See, for example, The Chemistry of Organic Film Formers, by D. H. Solomon, published by Robert E. Krieger Publishing Co., (1977), at pages 12–14; and Plastics Polymer and Science Technology, edited by M. D. Baijal, published by John Wiley & Sons (1982) at pages 604–605.

In general, however, the present invention includes activators. Condensation products of aliphatic aldehydes with aliphatic or aromatic amines, moreover, are preferred as such activators.

In the absence of such condensation products, an organic substance having sulfonyl chloride moieties is preferred. Most preferably, however, the initiator (or activator) comprises a condensation product of butyraldehyde and aniline. One such butyraldehyde-aniline condensation product, marketed under the trademark "VANAX 808", is currently commercially available from the R. T. Vanderbilt Company, Inc., 230 Park Avenue, New York, NY, 10017.

Also usable as catalyst initiators, in combination with or in place of the above-described initiators, are the tertiary amines which are set forth in U.S. Pat. No. 4,112,013 (at column 2, lines 10–13), which patent is hereby incorporated herein by reference.

The chlorosulfonated polyethylene polymer resin used contained sulfonyl chloride moiety which functions as a catalyst activator (or initiator). For certain adhesive compositions presented below, which do not include chlorosulfonated polyethylene polymer resin, certain organic sulfonyl chloride derivatives, such as, for example, propane sulfonyl chloride, or para-toluene sulfonyl chloride have been added to the adhesive composition to make up for the absence of sulfonyl chloride moiety.

The adhesive composition of the present invention further also includes a graft co-polymer resin. Generally speaking, the graft co-polymer resins of the present invention comprise particles of rubber or rubber-like cores or networks which are surrounded, and may even be encapsulated, by relatively hard shells.

Such graft co-polymer resins, moreover, as briefly discussed above, have generally been found useful as physical property-modifiers of PVC, or other normally-rigid plastics or the like. See, for example, U.S. Pat. No. 3,845,164 to Goto et al. Such physical property modifiers, moreover, have been found to increase flexibility and impact resistance of many normally-rigid plastics. In such a use, the graft co-polymer is generally a relatively small particle which, for example, can be dispersed throughout the normally-rigid plastic prior to injection molding thereof. Upon being thus dispersed throughout the plastic, the graft co-polymer resin particles, moreover, are generally not known to swell or otherwise react with the plastic.

In examples disclosed below, however, the preferred graft co-polymer particles have been observed to "swell" in size, and seem to react or otherwise interact with polymerizing monomeric components of the composition. Most ABS resins which are included in injection-moldable plastic compositions (for reasons outlined above), on the other hand, do not swell but rather appear to dissolve therein. As to the instant invention, however, when the preferred graft co-polymer resin particles were included in the below-presented adhesive compositions, it was observed that the preferred graft co-polymer particles generally swelled in size, became relatively gel-like and provided improved spreading and flow properties to the uncured adhesive compositions (discussed below).

Such improved flow properties are highly desirable in certain adhesive applications. For example, when an adhesive is applied to an article by means of a syringe-type applicator, many commercially available adhesives undesirably form a "string" of adhesive which generally extends from a first point on the article (where the adhesive was applied) to a second point (a subsequent position of the applicator) spaced from the first point. When the present invention was tested in just such an applicator, the flow properties of the present invention were such that a relatively small droplet of such adhesive was topically appliable to the point of application on the article to be bonded, with no adhesive string extending therefrom. Such a flow property of the present invention has also been tested for use in the field of adhesion of relatively small parts (for example, electronic parts) and the invention appears to be acceptable for such a use. During performance of the syringe-type applicator test, it was observed that certain effective, but relatively less-preferred graft co-polymer resins (e.g., ABS molding-grade resin) also appeared to dissolve in the methacrylate-based ester monomer.

In the instant invention, the methacrylate-based ester and methacrylate-based acid monomers polymerize and attach themselves to the chlorosulfonated polyethylene polymer resin particles. The mechanics of such attachment and polymerization are currently not completely known in detail. For example, it is not known to what extent attachment or polymerization occurs, nor is the order (of attachment and polymerization) known. At least some of these monomers, however, are believed to become attached during the initiation step of polymerization reaction or reactions.

The ester and acid monomers, moreover, are currently thought to penetrate the shell of individual graft co-polymer resin particles and polymerize therein thereby causing the shell or core or both to swell in size.

Regardless of theory, however, what has been observed when adhesive compositions comprising acrylate-based (preferably methacrylate-based) ester and acid monomers which have had chlorosulfonated polyethylene polymer and graft co-polymer resin particles included therewithin, is an adhesive composition having a surprising combination of enhanced overall adhesive and flow physical properties.

Preferred graft co-polymer resins are selected from the group consisting of acrylonitrile-butadiene-styrene (ABS), methacrylate-butadiene-styrene (MBS), methacrylate-acrylonitrile-butadiene-styrene (MABS), acrylate-styrene-acrylonitrile (ASA), all-acrylics, styrene-acrylonitrile grafted onto elastomeric backbones of ethylene-propylene-diene-monomer (SA EPDM), and methacrylic-acrylic rubber-styrene (MAS). More-preferred graft co-polymer resins are selected from the group consisting of MABS, ASA, all-acrylic and MBS. Most-preferred graft co-polymer resins are selected from the group consisting of MABS and ASA.

The ABS graft co-polymer resin preferably has a styrene-butadiene rubber core and a styrene-acrylonitrile shell.

The MBS graft co-polymer resin preferably has a styrene-butadiene rubber core and a shell of acrylic polymer or co-polymer.

The MABS graft co-polymer resin preferably has a styrene-butadiene rubber core and a shell of methacrylate-acrylonitrile co-polymer. More preferably, the MABS graft co-polymer resin has a core, which is approximately 75% by weight of the total weight thereof, which consists of butadiene and styrene in the weight ratio of about 50:25, and a shell of methyl methacrylate and acrylonitrile in the weight ratio of about 20:5.

The preferred ASA graft co-polymer resin is substantially as disclosed in U.S. Pat. No. 3,944,631 to Yu et al, which patent is herein incorporated by reference. That is, unlike the remainder of the above-described graft co-polymer resins, the preferred ASA graft co-polymer resin contained relatively little grafting (column 1, lines 31-32 in connection with column 8, lines 9-45 and column 9, lines 1-20). A most-preferred ASA graft co-polymer resin, marketed under the trademark "SCC 1015" (see Table II below), is substantially as described in the '631 patent and includes a crosslinked acrylate elastomer, a crosslinked styrene-acrylonitrile co-polymer and a linear styrene-acrylonitrile co-polymer. The most-preferred ASA graft co-polymer resin, moreover, appears morphologically to be made of interpenetrating polymer networks.

Preferred all-acrylic graft co-polymer resins are as disclosed in U.S. Pat. No. 3,985,703 to Ferry et al, which patent is herein incorporated by reference. Most-preferred all-acrylic graft co-polymer resins, marketed under the Trademarks "KM 323 B" and "KM 330" (see Table II below), have a rubber-type core which is approximately 75% of the total weight thereof, which consists of butyl methacrylate-type monomers and a shell of methyl methcrylate.

Examples of preferred, more-preferred and most-preferred graft co-polymer resins, discussed immediately above, which are currently commercially available and which are marketed under a variety of trademarks of well-known manufacturers, appear below in Table II.

TABLE II

| TYPE OF GRAFT CO-POLYMER RESIN | TRADEMARK | MANUFACTURER |
| --- | --- | --- |
| ABS | ABSON 120 | MOBAY CHEMICAL CO. PENN LINCOLN PARKWAY WEST PITTSBURGH, PA 15205 |
| | ABSON 161 | MOBAY CHEMICAL CO. |

TABLE II-continued

| TYPE OF GRAFT CO-POLYMER RESIN | TRADEMARK | MANUFACTURER |
|---|---|---|
| | ABSON 171 | PENN LINCOLN PARKWAY WEST PITTSBURGH, PA 15205 MOBAY CHEMICAL CO. PENN LINCOLN PARKWAY WEST PITTSBURGH, PA 15205 |
| | XP90030.01 | THE DOW CHEMICAL CO. MIDLAND, MI 48640 |
| | XP74027.00 | THE DOW CHEMICAL CO. MIDLAND, MI 48640 |
| MBS | KM 611 | ROHM & HAAS CO. INDEPENDENCE MALL WEST PHILADELPHIA, PA 19105 |
| | KM 608A | ROHM & HAAS CO. INDEPENDENCE MALL WEST PHILADELPHIA, PA 19105 |
| | KM 653 | ROHM & HAAS CO. INDEPENDENCE MALL WEST PHILADELPHIA, PA 19105 |
| | KM 641 | ROHM & HAAS CO. INDEPENDENCE MALL WEST PHILADELPHIA, PA 19105 |
| | KM BTA-IIIS | ROHM & HAAS CO. INDEPENDENCE MALL WEST PHILADELPHIA, PA 19105 |
| | KM BTA-IIIF | ROHM & HAAS CO. INDEPENDENCE MALL WEST PHILADELPHIA, PA 19105 |
| | 8003 B-X P | THE DOW CHEMICAL CO. |
| MABS | ACRYLOID KM 452 | ROHM & HAAS CO. |
| | BLENDEX 452 | BORG-WARNER CHEMICALS, INC. TECHNICAL CENTRE WASHINGTON, WV 26181 |
| ASA | SCC 1015 | STAUFFER CHEMICAL CO. 299 PARK AVE. NEW YORK, NY 10017 |
| ALL-ACRYLIC | KM 323B | ROHM & HAAS CO. |
| | KM 330 | ROHM & HAAS CO. |
| SA EPDM | ROVEL | UNIROYAL CHEMICAL DIVISION OF UNIROYAL, INC. NAUGATUCK, CT 06770 |
| MAS | VITAX | HITACHI, LTD. TOKYO, JAPAN |

Experimental Procedure

Unless indicated otherwise, adhesive compositions were prepared by combining two separate (i.e., distinct) mixtures of methyl methacrylate ester monomer. One of the two monomer mixtures contained the chlorosulfonated polyethylene resin. The other of the monomer mixtures contained the graft co-polymer resin. The mixtures were independently (i.e., separately) mixed, preferably using a "HOBART" mixer, and thereafter blended together, preferably using a "HOCKMEYER" high-speed dispersion apparatus, to make the adhesive compositions disclosed below.

Adhesive strength (i.e., compression shear) of bonds, as between plastic materials, formed from such adhesive compositions were measured using a modification of a test outlined in ASTM D905-49. To test compression shear strength, for example, adhesive-bond test specimens consisted of a first 25 mm×25 mm×6.3 mm plastic coupon bonded to a second 25 mm×50 mm×6.3 mm plastic coupon, substantially in accordance with the ASTM D905-49 test method mentioned above. The area of each coupon to be bonded was coated with a surface activator, such as, for example, the well-known condensation product of butyraldehyde and aniline discussed above. The surface activator, currently being sold commercially under the trademark "VANAX 808", moreover, included about 0.1 weight percent of copper naphthanate which had been added thereto. Then an effective amount of adhesive composition for substantially covering the area to be bonded was applied to one of the coupons, and the two coupons were thereafter pressed together. A 0.25 mm metal shim washer was used to measure (or gauge) the bond thickness. After conditioning for two days at room temperature (as used herein, "room temperature" is defined to be 25 degrees Centigrade), the coupons were thereafter tested in compression shear (substantially as specified in ASTM D905-49) using a crosshead speed of 1.27 mm per minute.

Adhesive shear strength of adhesive bonds formed between cold-rolled steel coupons were tested, in accordance with the test method of ASTM D-1002-64, using like pairs of 25 mm×76 mm×1.6 mm coupons. Such coupons were first washed with methyl ethyl ketone (MEK), grit blasted, and thereafter re-washed with MEK prior to being tested. Coupon surfaces were preferably coated with the butyraldehyde-aniline condensation-product surface activator (discussed immediately above), and thereafter had the adhesive composition applied thereto, also generally as described above, except that a mold was used to index the coupons to provide uniform bonds having an area of about 12.5 mm×25 mm and a thickness of about 0.2 mm. Such bonds were conditioned for two days at room temperature, and thereafter tested at a separation rate of 1.27 mm per minute.

Peel strength of the adhesive compositions were tested according to the test method of ASTM D-1876-61T, using a pair of like 25 mm×254 mm×0.5 mm cold-rolled steel coupons. The coupons were first washed with MEK, abraded with sandpaper, and thereafer re-cleaned with MEK. Approximately 9 inches of the length of one such coupon was bonded to approximately 9 inches of the length of the other coupon, using the activation and application technique described immediately above, except that 0.18 mm wire spacers were used to measure (or gauge) bond thickness as the coupons were pressed together with weights in accordance with the testing method of ASTM D-1876-61T. After conditioning for two days at room temperature, the samples were tested in 180 degree peel at a rate of 254 mm per minute.

Impact strength of the adhesive compositions disclosed below were tested generally according to ASTM D950-54, except that 12.7 mm (in diameter) steel bars (or rods) having lengths of 76.2 mm and 9.5 mm respectively were used instead of test specimens having dimensions specified in the testing method of ASTM D950-54. Surfaces to be bonded together were first solvent cleaned, then grit blasted, then activated, then bonded together, and thereafter conditioned for two days at room temperature prior to testing.

For the adhesive compositions disclosed below, a cure time of from about 6 to about 8 hours resulted in achieving approximately 80% or more of ultimate bond strength.

Preferred Adhesive Compositions

Example I discloses the performance of adhesive compositions containing varying ratios of chlorosulfonated polyethylene polymer resin to MABS graft co-polymer resin. Adhesive properties of the compositions were determined by conducting compression shear strength, lap shear strength, peel strength and impact strength tests thereon in accordance with procedures outlined above. Viscosity of adhesives nos. 1 and 2 were determined using a No. 3 spindle at 10 rpm. Viscosity of adhesives nos. 3, 4 and 5 were determined using a No. 4, a "TB" and a "TF" spindle, respectively, at 10 rpm.

EXAMPLE I

| COMPOSITION, PARTS BY WEIGHT | ADHESIVE NO. | | | | |
|---|---|---|---|---|---|
| | 1 | 2 | 3 | 4 | 5 |
| 40% CSPE[1] polymer resin (HYPALON 30) in MMA[2] monomer | 100 | 75 | 50 | 25 | 0 |
| 25% MABS graft co-polymer resin (BLENDEX 452) in MMA[2] monomer | 0 | 25 | 50 | 75 | 103[3] |
| Methacrylic Acid | 5 | 5 | 5 | 5 | 5 |
| CHP[4] | 0.5 | 0.5 | 0.5 | 0.5 | 0.5 |
| p-toluenesulfonyl chloride | 0 | 0 | 0 | 0 | 1.26 |
| Total of CSPE[1] polymer plus graft co-polymer | 40 | 36.25 | 32.5 | 28.75 | 35.5 |
| Ratio of CSPE[1] polymer to graft co-polymer | 40:0 | 30:6.25 | 20:12.5 | 10:18.75 | 0:35.5 |
| Brookfield Viscosity, cps | 8800 | 14,800 | 25,600 | 36,800 | 1,240.000 |
| Compression shear, psi | | | | | |
| ABS coupons | 1295 | 1405 | 1495 | 1070 | 1125 |
| PVC[6] coupons | 1630 | 2175 | 2400 | 1785 | 1765 |
| Poly-MMA[2] coupons | 1195 | 1475 | 2725 | 2045 | 2000 |
| Lap shear, psi (Steel coupons) | 3180 | n.t.[7] | 4300 | n.t.[7] | 1605 |
| Peel strength, pli | 22.5 | 27 | 29 | 26.5 | 35 |
| Impact Strength, ft-lb/sq-in | 15.7 | n.t.[7] | 20.3 | n.t.[7] | 22.6 |

Footnotes:
[1]CSPE = chlorosulfonated polyethylene
[2]MMA = methyl methacrylate
[3]Based on 34.5% MABS graft co-polymer resin in MMA monomer.
[4]CHP = cumene hydroperoxide
[5]Added to activate the cure of the adhesive in the absence of sulfonyl chloride moiety, otherwise usually provided by the chlorosulfonated polyethylene polymer resin.
[6]PVC = polyvinyl chloride
[7]n.t. = not tested Example IA further discloses the performance of adhesive compositions containing varying ratios of chlorosulfonated polyethylene polymer resin to MABS graft co-polymer resin, but at a substantially constant chlorosulfonated polyethylene polymer plus graft co-polymer solids level, and thereafter again noting the adhesive properties of the compositions (relative to Example I), so as to separate out effects which might otherwise be caused by variation of such solids level. Again, the adhesive properties of the compositions were determined by conducting compression shear strength, lap shear strength, peel strength and impact strength tests thereon in accordance with procedures outlined above. Viscosity of adhesive no. 6 was determined using a No. 2 spindle at 20 rpm. Viscosity of adhesives nos. 7, 8 were determined using a "TA" spindle at 20 rpm. Viscosity of adhesives nos. 9-12 were determined using a "TC" spindle at 10 rpm.

EXAMPLE 1A

| COMPOSITION, PARTS BY WEIGHT | ADHESIVE NO. | | | | | | |
|---|---|---|---|---|---|---|---|
| | 6 | 7 | 8 | 9 | 10 | 11 | 12 |
| CSPE[1] polymer resin (HYPALON 30) | 34.8 | 27.8 | 20.9 | 17.4 | 13.9 | 7.0 | 0 |
| MABS graft co-polymer resin (BLENDEX 452) | 0 | 7.0 | 13.9 | 17.4 | 20.9 | 27.8 | 34.8 |
| MMA[2] monomer | 65.2 | 65.2 | 65.2 | 65.2 | 65.2 | 65.2 | 65.2 |
| Methacrylic acid | 5.0 | 5.0 | 5.0 | 5.0 | 5.0 | 5.0 | 5.0 |
| CHP[3] | 0.5 | 0.5 | 0.5 | 0.5 | 0.5 | 0.5 | 0.5 |
| Propane sulfonyl chloride[4] | 0 | 0.34 | 0.67 | 0.84 | 1.01 | 1.35 | 1.69 |
| Total of CSPE[1] | 34.8 | 34.8 | 34.8 | 34.8 | 34.8 | 34.8 | 34.8 |

-continued

| COMPOSITION, PARTS BY WEIGHT | ADHESIVE NO. | | | | | | |
|---|---|---|---|---|---|---|---|
| | 6 | 7 | 8 | 9 | 10 | 11 | 12 |
| polymer plus graft co-polymer | | | | | | | |
| Ratio of CSPE[1] polymer to graft co-polymer | 34.8:0 | 27.8:7.0 | 20.9:13.9 | 17.4:17.4 | 13.9:20.9 | 7.0:27.8 | 0:34.8 |
| Brookfield Viscosity, cps | 2240 | 7200 | 43,200 | 92,000 | 120,000 | 208,000 | 264,000 |
| Compression shear, psi | | | | | | | |
| ABS coupons | 1550[5] | 1525[5] | 1350[5] | 1250[5] | 1350[5] | 1225[5] | 1200 |
| PVC[6] coupons | 2200[5] | 2000[5] | 2000[5] | 1900[5] | 1850[5] | 1900[5] | 1525 |
| Poly-MMA[2] coupons | 2650 | 2750 | 2650 | 2250 | 2375 | 1525 | nil |
| Lap shear, psi steel coupons | 3125 | 4275 | 4225 | 4090 | 3870 | 3740 | 3180 |
| Peel strength, pli | 27.5 | 35 | 39 | 38 | 38.5 | 34.5 | 30 |
| Impact strength, ft-lb/sq-in | 17.4 | 22.5 | 23.2 | 24.8 | 20.9 | 21.1 | 18.3 |

Footnotes:
[1]CSPE = chlorosulfonated polyethylene
[2]MMA = methyl methacrylate
[3]CHP = cumene hydroperoxide
[4]Added in varying amounts to activate the cure of the adhesive in the absence of sulfonyl chloride moiety, otherwise provided by the chlorosulfonated polyethylene polymer resin.
[5]Coupon failed at noted value.
[6]PVC = polyvinyl chloride Example II discloses performance of adhesive compositions when other methacrylate-based monomers, as compared to methyl methacrylate monomer, are used in place of methyl methacrylate monomer. To various percentages of MABS graft co-polymer resin in disclosed methacrylate-based monomers were added: chlorosulfonated polyethylene polymer resin, methacrylic acid, cumene hydroperoxide, and para-toluene sulfonyl chloride, in proportions substantially the same as those of adhesive No. 3 in Example I. Also, as provided in Example I, about 40%, by weight, of chlorosulfonated polyethylene polymer resin (HYPALON 30) was included in separate mixtures as to each particular methacrylate-based monomer being tested.

EXAMPLE II

| | Adhesive No. | | | | | |
|---|---|---|---|---|---|---|
| | 13 | 14 | 15 | 16 | 17 | 18 |
| MA[1] monomer used | methyl | ethyl | butyl | cyclo-hexyl | 2-ethyl hexyl | THF[2] |
| Percent MABS graft co-polymer resin (BLENDEX 452) in MA[1] monomer used | 25 | 25 | 27 | 24 | 19 | 25 |
| Compression shear, psi | | | | | | |
| ABS coupons | 1240 | 1275 | 540 | 100 | 525 | 545 |
| PVC[3] coupons | CF[4] | CF[4] | 1745 | 510 | 590 | 750 |
| Poly-MMA[5] coupons | 3140 | 1515 | 1345 | 200 | 730 | 660 |
| Lap Shear, psi Steel coupons | 3740 | 3375 | 2560 | 1400 | 1125 | 3070 |
| Peel Strength, pli | 34 | 33 | 7-25[6] | 1 | 5-15[6] | 3 |
| Impact Strength ft-lb/sq-in | 20 | 16 | 12 | 5 | 3 | 5 |

Footnotes:
[1]MA = methacrylate
[2]THF = Tetrahydrofurfuryl
[3]PVC = polyvinyl chloride
[4]CF = Coupon failed
[5]MMA = methyl methacrylate
[6]A saw-tooth pattern was being produced on recording chart (i.e., the bond grabs and slips).

Example III discloses performance of adhesive compositions which included various ratios of chlorosulfonated polyethylene polymer resin to ASA graft co-polymer resin.

EXAMPLE III

| COMPOSITION, PARTS BY WEIGHT | ADHESIVE NO. | | | | |
|---|---|---|---|---|---|
| | 19 | 20 | 21 | 22 | 23 |
| 40% CSPE[1] polymer resin (HYPALON 30) in MMA[2] monomer | 100 | 75 | 50 | 25 | 0 |
| 22.5% ASA graft co-polymer resin (SCC 1015) in MMA[2] monomer | 0 | 25 | 50 | 75 | 100 |
| Methacrylic acid | 5 | 5 | 5 | 5 | 5 |
| CHP[3] | 0.5 | 0.5 | 0.5 | 0.5 | 0.5 |
| p-toluene sulfonyl chloride | 0 | 0 | 0 | 0 | 1.26[4] |
| Total of CSPE[1] polymer plus graft co-polymer | 40 | 35.63 | 31.25 | 26.88 | 22.5 |
| Ratio of CSPE[1] polymer to graft co-polymer | 40:0 | 30:5.63 | 20:11.25 | 10:16.88 | 0:22.5 |
| Compression shear, psi | | | | | |
| ABS coupons | 1550 | 1065 | 1100 | 475 | 1415 |
| PVC[5] coupons | C.F.[6] | C.F.[6] | 2050 | 1640 | C.F.[6] |

| COMPOSITION, PARTS BY WEIGHT | ADHESIVE NO. | | | | |
|---|---|---|---|---|---|
| | 19 | 20 | 21 | 22 | 23 |
| Poly-MMA[2] coupons | 3025 | 1900 | 1875 | 1850 | 1700 |
| Lap Shear, psi Steel coupons | 3420 | 4400 | 4290 | 4290 | 4030 |
| Peel Strength, pli | 15 | 24 | 27 | 25 | 10 |
| Impact Strength, ft-lb/sq-in | 16.5 | n.t.[7] | 15 | n.t.[7] | 14 |

Footnotes:
[1]CSPE = chlorosulfonated polyethylene
[2]MMA = methyl methacrylate
[3]CHP = cumene hydroperoxide
[4]Added to activate the cure of the adhesive in the absence of sulfonyl chloride moiety, otherwise usually provided by the chlorosulfonated polyethylene polymer resin
[5]PVC = polyvinyl chloride
[6]C.F. = Coupon failed
[7]n.t. = not tested Examples III-A and III-B disclose performance of adhesive compositions, which include varying ratios of chlorosulfonated polyethylene polymer resin to all-acrylic graft co-polymer resins.

EXAMPLE III-A

| COMPOSITION, PARTS BY WEIGHT | ADHESIVE NO. | | |
|---|---|---|---|
| | 24 | 25 | 26 |
| 40% CSPE[1] polymer resin (HYPALON 30) in MMA[2] monomer | 75 | 50 | 25 |
| 17.5% All Acrylic graft co-polymer resin (KM 323 B) in MMA[2] monomer | 25 | 50 | 75 |
| Methacrylic acid | 5 | 5 | 5 |
| CHP[3] | 0.5 | 0.5 | 0.5 |
| Total of CSPE[1] polymer plus graft co-polymer | 34.38 | 28.75 | 23.13 |
| Ratio of CSPE[1] polymer to graft co-polymer | 30:4.38 | 20:8.75 | 10:13.13 |
| Compression shear, psi | | | |
| ABS coupons | 1300 | 1325 | 875 |
| PVC[4] coupons | 2000 | 1725 | 1200 |
| Poly-MMA[2] coupons | 2175 | 3450 | 2525 |
| Lap Shear (steel coupons), psi | 4110 | 4200 | 3610 |
| Peel strength, pli | 30 | 18 | 13 |
| Impact strength, ft-lb/sq-in | 12.7 | 10.6 | 9.2 |

Footnotes:
[1]CSPE = chlorosulfonated polyethylene
[2]MMA = methyl methacrylate
[3]CHP = cumene hydroperoxide
[4]PVC = polyvinyl chloride

EXAMPLE III-B

| COMPOSITION, PARTS BY WEIGHT | ADHESIVE NO. | | |
|---|---|---|---|
| | 27 | 28 | 29 |
| 40% CSPE[1] polymer resin (HYPALON 30) in MMA[2] monomer | 75 | 50 | 25 |
| 18.1% All Acrylic graft co-polymer resin (KM 330) in MMA[2] monomer | 25 | 50 | 75 |
| Methacrylic Acid | 5 | 5 | 5 |
| CHP[3] | 0.5 | 0.5 | 0.5 |
| Total of CSPE[1] polymer plus graft co-polymer | 34.53 | 29.05 | 23.58 |
| Ratio of CSPE polymer to graft co-polymer | 30:4.63 | 20:9.05 | 10:13.58 |
| Compression shear, psi | | | |
| ABS coupons | 825 | 1050 | 675 |
| PVC[4] coupons | C.F.[5] | C.F.[5] | 1350 |
| Poly-MMA[2] coupons | 1890 | 2115 | 1390 |
| Lap shear (steel coupons), psi | 4175 | 4090 | 3730 |
| Peel strength, pli | 31 | 32 | 33 |
| Impact strength, ft-lb/sq-in | n.t.[6] | n.t.[6] | n.t.[6] |

Footnotes:
[1]CSPE = chlorosulfonated polyethylene
[2]MMA = methyl methacrylate
[3]CHP = cumene hydroperoxide
[4]PVC = polyvinyl chloride
[5]C.F. = Coupon failed
[6]n.t. = not tested Examples III-C through III-G, disclose performance of adhesive compositions, which include varying ratios of chlorosulfonated polyethylene polymer resin to MBS graft co-polymer resins. As between these MBS graft co-polymer resins, the KM 641 (Example III-E) has a relatively smaller particle size than the KM 611 (Example III-D), which in turn has a relatively smaller particle size than the KM 653 (Example III-F).

EXAMPLE III-C

| COMPOSITION, PARTS BY WEIGHT | ADHESIVE NO. | | |
|---|---|---|---|
| | 30 | 31 | 32 |
| 40% CSPE[1] polymer resin (HYPALON 30) in MMA[2] monomer | 75 | 50 | 25 |
| 32.25% MBS graft co-polymer resin (KM 608A) in MMA[2] | 25 | 50 | 75 |
| Methacrylic acid | 5 | 5 | 5 |
| CHP[3] | 0.5 | 0.5 | 0.5 |
| Total of CSPE[1] polymer plus graft co-polymer | 38.13 | 36.25 | 34.38 |
| Ratio of CSPE[1] polymer to graft co-polymer | 30:8.13 | 20:16.25 | 10:24.38 |
| Compression shear, psi | | | |
| ABS coupons | n.t.[4] | 300 | n.t.[4] |
| PVC[5] coupons | n.t[4] | 1250 | n.t.[4] |
| Poly-MMA[2] coupons | n.t.[4] | 1200 | n.t.[4] |
| Lap shear (steel coupons), psi | 4065 | 3980 | 1190 |
| Peel strength, pli | n.t.[4] | 26 | n.t.[4] |
| Impact strength, ft-lb/sq-in | n.t.[4] | 15 | n.t.[4] |

Footnotes:
[1]CSPE = chlorosulfonated polyethylene
[2]MMA = methyl methacrylate
[3]CHP = cumene hydroperoxide
[4]n.t. = not tested
[5]PVC = polyvinyl chloride

EXAMPLE III-D

| COMPOSITION, PARTS BY WEIGHT | ADHESIVE NO. 33 | ADHESIVE NO. 34 | ADHESIVE NO. 35 |
|---|---|---|---|
| 40% CSPE[1] polymer resin (HYPALON 30) in MMA[2] monomer | 75 | 50 | 25 |
| 31.8% MBS graft co-polymer resin (KM 611) in MMA[2] monomer | 25 | 50 | 75 |
| Methacrylic acid | 5 | 5 | 5 |
| CHP[3] | 0.5 | 0.5 | 0.5 |
| Total of CSPE[1] polymer plus graft co-polymer | 37.95 | 35.90 | 33.85 |
| Ratio of CSPE[1] polymer to graft co-polymer | 30:7.95 | 20:15.90 | 10:23.85 |
| Compression shear, psi | | | |
| ABS coupons | n.t.[4] | 775 | n.t.[4] |
| PVC[5] coupons | n.t.[4] | 1025 | n.t.[4] |
| Poly-MMA[2] coupons | n.t.[4] | 2200 | n.t.[4] |
| Lap Shear (steel coupons), psi | 4310 | 4125 | 3550 |
| Peel strength, pli | n.t.[4] | 30 | n.t.[4] |
| Impact strength, ft-lb/sq-in | n.t.[4] | 19.4 | n.t.[4] |

Footnotes:
[1]CSPE = chlorosulfonated polyethylene
[2]MMA = methyl methacrylate
[3]CHP = cumene hydroperoxide
[4]n.t. = not tested
[5]PVC = polyvinyl chloride

EXAMPLE III-E

| COMPOSITION, PARTS BY WEIGHT | ADHESIVE NO. 36 | ADHESIVE NO. 37 | ADHESIVE NO. 38 |
|---|---|---|---|
| 40% CSPE[1] polymer resin (HYPALON 30) in MMA[2] monomer | 75 | 50 | 25 |
| 35% MBS graft co-polymer resin (KM 641) in MMA[2] monomer | 25 | 50 | 75 |
| Methacrylic acid | 5 | 5 | 5 |
| CHP[3] | 0.5 | 0.5 | 0.5 |
| Total of CSPE[1] polymer plus graft co-polymer | 38.75 | 37.50 | 36.25 |
| Ratio of CSPE[1] polymer to graft co-polymer | 30:8.75 | 20:17.50 | 10:26.25 |
| Compression shear, psi | | | |
| ABS coupons | n.t.[4] | 350 | n.t.[4] |
| PVC[5] coupons | n.t.[4] | 1075 | n.t.[4] |
| Poly-MMA[2] coupons | n.t.[4] | 1375 | n.t.[4] |
| Lap shear (steel coupons), psi | 4220 | 3660 | 2660 |
| Peel strength, pli | n.t.[4] | 15 | n.t.[4] |
| Impact strength, ft-lb/sq-in | n.t.[4] | 12.3 | n.t.[4] |

Footnotes:
[1]CSPE = chlorosulfonated polyethylene
[2]MMA = methyl methacrylate
[3]CHP = cumene hydroperoxide
[4]n.t. = not tested
[5]PVC = polyvinyl chloride

EXAMPLE III-F

| COMPOSITION, PARTS BY WEIGHT | ADHESIVE NO. 39 | ADHESIVE NO. 40 | ADHESIVE NO. 41 |
|---|---|---|---|
| 40% CSPE[1] polymer resin (HYPALON 30) in MMA[2] monomer | 75 | 50 | 25 |
| 24.1% MBS graft co-polymer resin (KM 653) in MMA[2] monomer | 25 | 50 | 75 |
| Methacrylic acid | 5 | 5 | 5 |
| CHP[3] | 0.5 | 0.5 | 0.5 |
| Total of CSPE[1] polymer plus graft co-polymer | 36.03 | 32.05 | 28.08 |
| Ratio of CSPE[1] polymer to graft co-polymer | 30:6.03 | 20:12.05 | 10:18.08 |
| Compression shear, psi | | | |
| ABS coupons | 975 | 365 | 415 |
| PVC[4] coupons | c.f.[5] | 1300 | 1025 |
| Poly-MMA[2] coupons | 1265 | 1025 | 2475 |
| Lap shear strength steel coupons, psi | 4205 | 3520 | nil |
| Peel strength, pli | 38 | 15 | nil |
| Impact strength, ft-lb/sq-in | n.t.[6] | n.t.[6] | n.t.[6] |

Footnotes:
[1]CSPE = chlorosulfonated polyethylene
[2]MMA = methyl methacrylate
[3]CHP = cumene hydroperoxide
[4]PVC = polyvinyl chloride
[5]c.f. = coupon failed
[6]n.t. = not tested

EXAMPLE III-G

| COMPOSITION, PARTS BY WEIGHT | ADHESIVE NO. 42 | ADHESIVE NO. 43 | ADHESIVE NO. 44 |
|---|---|---|---|
| 40% CSPE[1] polymer resin (HYPALON 30) in MMA[2] monomer | 75 | 50 | 25 |
| 19.6% MBS graft co-polymer resin (8003 B-X P) in MMA[2] monomer | 25 | 50 | 75 |
| Methacrylic acid | 5 | 5 | 5 |
| CHP[3] | 0.5 | 0.5 | 0.5 |
| Total of CSPE[1] polymer plus graft co-polymer | 34.90 | 29.80 | 24.70 |
| Ratio of CSPE[1] polymer to graft co-polymer | 30:4.90 | 20:9.80 | 10:14.70 |
| Compression shear, psi | | | |
| ABS coupons | 650 | 325 | 215 |
| PVC[4] coupons | c.f.[5] | 1325 | 1050 |
| Poly-MMA[2] coupons | 1215 | 940 | 1225 |
| Lap shear strength steel coupons, psi | 4215 | 3615 | 3425 |
| Peel strength, pli | 38 | 41 | 36.5 |
| Impact strength, ft-lb/sq-in | n.t.[6] | n.t.[6] | n.t.[6] |

Footnotes:
[1]CSPE = chlorosulfonated polyethylene
[2]MMA = methyl methacrylate
[3]CHP = cumene hydroperoxide
[4]PVC = polyvinyl chloride
[5]c.f. = coupon failed
[6]n.t. = not tested Examples IV-A through IV-E disclose performance of adhesive compositions which include either a chlorosulfonated polyethylene polymer resin or a graft co-polymer resin, but not both. The adhesive composition of Example IV-A includes chlorosulfonated polyethylene polymer resin. The adhesive compositions of Examples IV-B through IV-D include MBS graft co-polymer resins. The adhesive composition of Example IV-E includes an all-acrylic graft co-polymer resin.

EXAMPLE IV-A

| COMPOSITION, PARTS BY WEIGHT | ADHESIVE NO. 45 |
|---|---|
| CSPE[1] polymer resin (HYPALON 30) | 40 |
| MMA[2] monomer | 60 |
| Methacrylic acid | 5 |
| CHP[3] | 0.5 |
| Compression shear, psi | |
| ABS coupons | 1450 |
| PVC[4] coupons | c.f.[5] |
| Poly-MMA[2] coupons | 1900 |
| Lap shear, psi | 3360 |
| Peel strength, pli | 19 |
| Impact strength, ft-lb/sq-in | 13.5 |

Footnotes:
[1]CSPE = chlorosulfonated polyethylene
[2]MMA = methyl methacrylate
[3]CHP = cumene hydroperoxide
[4]PVC = polyvinyl chloride
[5]c.f. = coupon failed

EXAMPLE IV-B

| COMPOSITION, PARTS BY WEIGHT | ADHESIVE NO. 46 |
|---|---|
| MBS graft co-polymer resin (KM 653) | 33.5 |
| MMA[1] monomer | 66.5 |
| Methacrylic acid | 5 |
| CHP[2] | 0.5 |
| p-toluene sulfonyl chloride[3] | 5 |
| Compression shear, psi | |
| ABS coupons | 695 |
| PVC[4] coupons | 1280 |
| Poly-MMA[1] coupons | 595 |
| Lap shear, psi | 90 |
| Peel strength, pli | 1 |
| Impact strength, ft-lb/sq-in | 1.0 |

Footnotes:
[1]MMA = methyl methacrylate
[2]CHP = cumene hydroperoxide
[3]Added to activate the cure of the adhesive in the absence of the sulfonyl chloride moiety usually otherwise provided by the chlorosulfonated polyethylene polymer resin.
[4]PVC = polyvinyl chloride

EXAMPLE IV-C

| COMPOSITION, PARTS BY WEIGHT | ADHESIVE NO. 47 |
|---|---|
| MBS graft co-polymer resin (KM 611) | 33.5 |
| MMA[1] monomer | 66.5 |
| Methacrylic acid | 5 |
| CHP[2] | 0.5 |
| p-toluene sulfonyl chloride[3] | 5 |
| Compression shear, psi | |
| ABS coupons | 620 |
| PVC[4] coupons | 525 |
| Poly-MMA coupons | 635 |
| Lap shear, psi | 35 |
| Peel strength, pli | 2 |
| Impact strength, ft-lb/sq-in | 1.3 |

Footnotes:
[1]MMA = methyl methacrylate
[2]CHP = cumene hydroperoxide
[3]Added to activate the cure of the adhesive in the absence of the sulfonyl chloride moiety usually otherwise provided by the chlorosulfonated polyethylene polymer resin.
[4]PVC = polyvinyl chloride

EXAMPLE IV-D

| COMPOSITION, PARTS BY WEIGHT | ADHESIVE NO. 48 |
|---|---|
| MBS graft co-polymer resin (8003 B-X P) | 33.5 |
| MMA[1] monomer | 66.5 |
| Methacrylic acid | 5 |
| CHP[2] | 0.5 |
| p-toluene sulfonyl chloride[3] | 5 |
| Compression shear, psi | |
| ABS coupons | 375 |
| PVC[4] coupons | 810 |
| Poly-MMA[1] coupons | 725 |
| Lap shear, psi | 580 |
| Peel strength, pli | 7 |
| Impact strength, ft-lb/sq-in | 0.9 |

Footnotes:
[1]MMA = methyl methacrylate
[2]CHP = cumene hydroperoxide
[3]Added to activate the cure of the adhesive in the absence of the sulfonyl chloride moiety usually otherwise provided by the chlorosulfonated polyethylene polymer resin.
[4]PVC = polyvinyl chloride

EXAMPLE IV-E

| COMPOSITION, PARTS BY WEIGHT | ADHESIVE NO. 49 |
|---|---|
| All-acrylic graft co-polymer resin (KM 323 B) | 21.5 |
| MMA[1] | 78.5 |
| Methacrylic acid | 5 |
| CHP[2] | 0.5 |
| p-toluene sulfonyl chloride[3] | 5 |
| Compression shear, psi | |
| ABS coupons | 690 |
| PVC[4] coupons | 995 |
| Poly-MMA[1] coupons | 375 |
| Lap shear, psi | 160 |
| Peel strength, pli | 1 |
| Impact strength, | 3.0 |

| COMPOSITION, PARTS BY WEIGHT | ADHESIVE NO. 49 |
|---|---|
| ft-lb/sq-in | |

Footnotes:
[1]MMA = methyl methacrylate
[2]CHP = cumene hydroperoxide
[3]Added to activate the cure of the adhesive in the absence of the sulfonyl chloride moiety usually otherwise provided by the chlorosulfonated polyethylene polymer resin.
[4]PVC = polyvinyl chloride For the adhesive compositions of the instant invention, polymerization of the acrylate-based (preferably methacrylate-based) ester and acid monomers thereof causes the composition to set up, harden, and cure. The catalyst "triggers" the polymerization steps. The activator (or initiator) when included, in turn, triggers the catalyzation step.

In a first preferred method of practicing the present invention, the adhesive composition, excluding the activator (or initiator), is applied to at least a first one of at least two surfaces which are to be bonded together. The activator is applied to the other surface. The two surfaces are then brought into such close proximity that the activator contacts the adhesive composition, whereby the activator triggers catalytic action of the catalyst. Such action by the catalyst, in turn, initiates polymerization of the monomers, whereby the composition is caused to set up, harden and cure. Such an application or method of use is generally referred to as a one-part adhesive because only a relatively small amount of activator (relative to the amount of total adhesive composition) is needed to trigger the action of the catalyst.

A second preferred method of practicing the present invention is via the combination or mixture of both parts of a so-called two-part adhesive. The two-part adhesive comprises first and second portions of the adhesive composition. The first portion includes some of the adhesive composition ingredients and the catalyst. The second portion includes the remainder of the adhesive composition components and the activator.

Volumetric mix ratios of the two portions generally can range from about 5:95 to about 95:5, and 1:1 is often preferred. Regardless of the volumetric mix ratio chosen, however, the relative proportions of the catalyst and activator (or initiator) components must be selected so that effective polymerization results.

Example V is approximately a 1:1 equal volume mixture of parts A and B. Upon parts A and B being mixed together, the adhesive composition had a working time (i.e., that amount of time wherein the composition is generally acknowledged to be substantially workable or fluid-like) which lasted for up to about 2 minutes after contacting the catalyst-included portion with the initiator-included portion. More specifically, the adhesive composition began to thicken or gel in about 2.5 minutes (after having been mixed), exhibited a definite exotherm during mixing and hardening, and hardened in about 5 minutes (after initial mixing). Approximately 5 grams of part A were mixed with approximately 5 grams of part B. Larger quantities are expected to harden in less time, and exhibit a relatively more pronounced exotherm. About 80% or more of the ultimate bond strength is achieved in from about 6 to about 8 hours.

EXAMPLE V

| COMPOSITION, PARTS BY WEIGHT | ADHESIVE NO. 50 |
|---|---|
| Part A | |
| CSPE[1] polymer resin (HYPALON 30) | 35.5 |
| MMA[2] | 53.2 |
| Methacrylic Acid | 9.8 |
| CHP[3] | 1.0 |
| Ionol[4] | 0.5 |
| TOTAL, Part A | 100.0 |
| Part B | |
| MABS graft co-polymer resin (Acryloid KM 452) | 25.0 |
| MMA[2] | 75.0 |
| Initiator No. 1 (VANAX 808) | 4.995 |
| Initiator No. 2 (Copper Naphthanate solution)[5] | 0.005 |
| TOTAL, Part B | 105.00 |
| Compression shear, psi | |
| ABS coupons | 1510 |
| PVC[6] coupons | 2610 |
| Poly-MMA[2] coupons | 4200 |
| Lap Shear, psi | |
| Grit-blasted steel coupons | 3960 |
| Peel Strength, pli | — |
| Impact Strength, 22.6 (ft-lb/sq-in) | |

Footnotes:
[1]CSPE = chlorosulfonated polyethylene
[2]MMA = methyl methacrylate
[3]CHP = cumene hydroperoxide (the catalyst)
[4]Ionol is a stabilizer which serves to avoid premature gelation of the graft co-polymer resin.
[5]Sold commercially by Tenneco Chemicals, Inc., Heyden Division, 280 Park Avenue, New York, NY, 10017, under the NUODEX trademark.
[6]PVC = polyvinyl chloride Table III provides additional information as to physical properties of one of the most-preferred graft co-polymer resins.

TABLE III

| PHYSICAL PROPERTIES | TEST METHOD | ASTM CONDITION | UNITS | MABS GRAFT CO-POLYMER RESIN (BLENDEX 452) |
|---|---|---|---|---|
| Tensile strength | D-638-71 0.2 in/min | 73° F. | PSI | 800 |
| Tensile Modulus | D-638-71 | 73° F. | PSI × $10^5$ | 0.4 |
| Heat Deflecton (Annealed) | D-648-72 | 264 PSI | °F. @ 10 mils Deflection | 118 |
| Specific Gravity | D-792-66, Method A-1 | 73° F. | — | 1.01 |
| Hardness D | D-530, Type "D", Method "A" | 73° F. | — | 60 |

TABLE III-continued

| PHYSICAL PROPERTIES | TEST METHOD | ASTM CONDITION | UNITS | MABS GRAFT CO-POLYMER RESIN (BLENDEX 452) |
|---|---|---|---|---|
| Izod Impact, ¼ in | D-256-72, Method "A" | 73° F. | ft-lb/in | 5.5 |
| Bulk Density | — | 73° F. | lb/cu-ft | 16 |

Example VI discloses adhesive compositions produced by varying the relative amount of methacrylic acid in the adhesive composition mixture. Relative amounts of the remainder components were held substantially constant so as to determine the effect or variation of the methacrylic acid.

Example VII discloses adhesive compositions containing three different varieties (or types) of chlorinated polyethylene, discussed above (see, Table I-A) with Table I-A) in combination with MABS graft co-polymer resin.

EXAMPLE VI

| COMPOSITION, PARTS BY WEIGHT | ADHESIVE NO. | | | |
|---|---|---|---|---|
| | 51 | 52 | 53 | 54 |
| CSPE polymer resin (HYPALON 30) | 20 | 20 | 20 | 20 |
| MABS graft co-polymer resin (BLENDEX 452) | 12.5 | 12.5 | 12.5 | 12.5 |
| MMA | 67.5 | 67.5 | 67.5 | 67.5 |
| Methacrylic acid | 15 | 10 | 5 | 0 |
| CHP | 0.5 | 0.5 | 0.5 | 0.5 |
| Ionol | 0.25 | 0.25 | 0.25 | 0.25 |
| Lap shear, psi | 4650 | 4550 | 4450 | 2300 |

Footnotes:
[1]CSPE = chlorosulfonated polyethylene
[2]MMA = methyl methacrylate
[3]CHP = cumene hydroperoxide
[4]Ionol is a stabilizer which serves to avoid premature gelation of the graft co-polymer resin.
[5]Grit-blasted steel coupons

EXAMPLE VII

| COMPOSITION, PARTS BY WEIGHT | ADHESIVE NO. | | |
|---|---|---|---|
| | 55 | 56 | 57 |
| 40% CSPE[1] polymer resin (HYPALON 20) in MMA[2] monomer | 50 | — | — |
| 40% CSPE[1] polymer resin (HYPALON LD-999) in MMA[2] monomer | — | 50 | — |
| 40% CSPE[1] polymer resin (HYPALON 485) in MMA[2] monomer | — | — | 50 |
| 25% MABS graft co-polymer resin (BLENDEX 452) in MMA[2] monomer | 50 | 50 | 50 |
| Methacrylic acid | 5 | 5 | 5 |
| CHP[3] | 0.5 | 0.5 | 0.5 |
| Compression shear, psi | | | |
| ABS coupons | 1275 | 1150 | n.t.[5] |
| PVC[4] coupons | 1400 | 1450 | n.t.[5] |
| Poly-MMA[2] coupons | 3225 | 2950 | n.t.[5] |
| Lap shear, psi | 3705 | 3705 | 4095 |
| Peel strength, pli | 33 | 30 | 33 |
| Impact strength, | 20.5 | 21.3 | 22.9 |

| COMPOSITION, PARTS BY WEIGHT | ADHESIVE NO. | | |
|---|---|---|---|
| | 55 | 56 | 57 |
| ft-lb/sq-in | | | |

Footnotes:
[1]CSPE = chlorosulfonated polyethylene
[2]MMA = methyl methacrylate
[3]CHP = cumene hydroperoxide
[4]PVC = polyvinyl chloride
[5]n.t. = not tested What has been described herein are novel methacrylate-based compositions. While the novel methacrylate-based compositions of the invention have been described with reference to use as adhesives, the invention is not limited thereto. On the contrary, alternatives, changes or modifications may become apparent to those skilled in the art upon reading the foregoing description. Accordingly, such alternatives, changes and modifications are to be considered as forming a part of the invention insofar as they fall within the spirit and scope of the appended claims.

For example, in addition to having usefulness in the area of adhesives, it is contemplated that the present invention is generally useful in the areas of repair products, casting materials and coatings. In the repair-products field, for example, a piece of fiberglass cloth can be wetted on both sides with the present invention to make a fiberglass patch. It is further contemplated that the present invention can include an effective amount of metal particles for producing repair products having a variety of commercially desirable features.

Furthermore, in the casting-materials area, the present invention can be used as a carrier of preselected components much the way epoxies are currently used.

In the coatings field, for example, the present invention can be used to permanently coat metal substrates for a variety of reasons.

What is claimed is:

1. A method of adhesively bonding together at least two surfaces comprising:
applying to one of said surfaces an effective amount of a catalyst activator selected from the group consisting of aldehyde-amine condensation products and tertiary amines;
applying to the other one of said surfaces an adhesive composition comprising:
a methacrylate-based ester monomer selected from the group consisting of methyl methacrylate, ethyl methacrylate, butyl methacrylate, cyclohexyl methacrylate and tetrahydrofurfuryl methacrylate;
a free radical generating catalyst selected from the group consisting of organic peroxide, organic hydroperoxide, perester and peracid;
and relative bond promoting effective amounts of (a) a chlorine containing polymer selected from the group consisting of a chlorinated polyethylene polymer plus an organic sulfonyl chloride and a chlorosulfonated polyethylene polymer resin and (b) a core-and-shell type graft co-polymer resin which swells in size and becomes gel-like in the monomer;

said effective amounts of said catalyst activator being sufficient for triggering catalysis and polymerization of said monomer; and bringing said surfaces into such proximity, such that said adhesive composition contacts said catalyst activator and causes said ester monomer to polymerize;

thereby providing said composition with enhanced overall compressive shear strength, lap shear strength, peel strength, and impact strength adhesive physical properties, and whereupon said adhesive composition achieves at least about 80 percent of its ultimate bond strength in from about 6 to 8 hours.

2. The method of claim 1 wherein the chlorine containing polymer is a chlorosulfonated polymer resin which contains about 43 weight percent chlorine, about 1.1 weight percent sulfur and about 34 millimoles sulfonyl chloride moiety per 100 grams thereof.

3. The method of claim 1 wherein said graft co-polymer resin is selected from the group consisting of ABS, MBS, MABS, ASA, all-acrylic, SA EPDM and MAS.

4. The method of claim 1 wherein said graft co-polymer resin is selected from the group consisting of MABS, ASA, all-acrylic and MBS.

5. The method of claim 1 wherein said adhesive composition further includes methacrylic acid monomer.

6. The method of claim 1 wherein said methacrylate-based ester monomer is selected from the group consisting of methyl methacrylate and ethyl methacrylate.

7. A method of adhesively bonding together at least two surfaces comprising:

applying to one of said surfaces an effective amount of a catalyst activator selected from the group consisting of aldehyde—amine condensation products and tertiary amines;

applying to the other one of said surfaces an adhesive composition comprising:

a methacrylate-based ester monomer selected from the group consisting of methyl methacrylate and ethyl methacrylate;

methacrylic acid monomer;

free-radical generating catalyst selected from the group consisting of organic peroxide, organic hydroperoxide, perester and peracid; and relative bond promoting effective amounts of (a) a chlorosulfonated polyethylene polymer resin containing about 43 weight percent chlorine, about 1.1 weight percent sulfur and about 34 millimoles sulfonyl chloride moiety per 100 grams thereof and (b) a core-and-shell type graft co-polymer resin which swells in size and becomes gel-like in the monomer selected from the group consisting of MABS, ASA, all-acrylic, and MBS;

said effective amounts of said catalyst activator being sufficient for triggering catalysis and polymerization of said ester and acid monomers; and bringing said surfaces into such proximity that said adhesive composition contacts said activator and causes said ester and acid monomers to polymerize;

thereby providing said composition with enhanced overall compression shear strength, lap shear strength, peel strength and impact strength adhesive physical properties, and whereupon said adhesive composition achieves at least about 80 percent of its ultimate bond strength in from about 6 to 8 hours.

8. A method of adhesively bonding together at least two surfaces comprising:

(1) a methacrylate-based ester monomer selected from the group consisting of methyl methacrylate, ethyl methacrylate, butyl methacrylate, cyclohexyl methacrylate, 2-ethylhexyl methacrylate and tetrahydrofurfuryl methacrylate;

(2) a free-radical generating catalyst selected from the group consisting of organic peroxide, organic hydroperoxide, perester and peracid;

(3) a catalyst activator selected from the group consisting of aldehyde-amine condensation products and tertiary amines; and (4) relative bond promoting effective amounts of (a) a chlorine containing polymer selected from the group consisting of a chlorinated polyethylene polymer plus an organic sulfonyl chloride and a chlorosulfonated polyethylene polymer resin and (b) a core-and-shell type graft co-polymer resin which swells in size and becomes gel-like in the monomer, one of said adhesive composition portions including all of said catalyst and none of said catalyst activator, the other of said adhesive composition portions including all of said catayst activator and none of said catalyst;

applying to one of said surfaces an effective amount of said one adhesive composition portion; applying to the other one of said surfaces an effective amount of said other adhesive composition portion; said catalyst activator being present in sufficient quantity in one of said adhesive composition portions for activating the catalyst in the other of said adhesive composition portions; and bringing said surfaces into such proximity that the adhesive composition portion containing the catalyst activator contacts the adhesive composition portion containing the catalyst thereby activating the catalyst and causing said ester monomer to polymerize; thus providing said composition with enhanced overall compression shear strength, lap shear strength, peel strength and impact strength adhesive physical properties, whereupon said adhesive composition achieves at least about 80 percent of its ultimate bond strength in from about 6 to about 8 hours.

9. The method of claim 8 wherein the chlorine containing polymer is a chlorosulfonated polyethylene polymer resin which contains about 43 weight percent chlorine, about 1.1 weight percent sulfur and about 34 millimoles sulfonyl chloride moiety per 100 grams thereof.

10. The method of claim 8 wherein said graft co-polymer resin is selected from the group consisting of ABS, MBS, MABS, ASA, all-acrylic, SA EPDM and MAS.

11. The method of claim 8 wherein said graft co-polymer resin is selected from the group consisting of MABS, ASA, all-acrylic and MBS.

12. The method of claim 8 wherein said adhesive composition further includes methacrylic acid monomer.

13. The method of claim 8 wherein said methacrylate-based ester monomer is selected from the group consisting of methyl methacrylate and ethyl methacrylate.

14. A method of adhesively bonding together at least two surfaces comprising:

preparing in at least two portions an adhesive composition comprising:
(1) a methacrylate-based ester monomer selected from the group consisting of methyl methacrylate and ethyl methacrylate; methacrylic acid monomer;
(2) a free-radical generating catalyst selected from the group consisting of organic peroxide, organic hydroperoxide, perester and peracid;
(3) a catalyst activator selected from the group consisting of aldehyde-amine condensation products; and
(4) relative bond promoting effective amounts of:
(a) a chlorosulfonated polyethylene polymer resin containing about 43 weight percent chlorine, about 1.1 weight percent sulfur, and about 34 millimoles sulfonyl chloride moiety per 100 grams thereof; and
(b) a core-and-shell type graft co-polymer resin which swells in size and becomes gel-like in the monomer selected from the group consisting of MABS, ASA, all acrylic and MBS, one of said adhesive composition portions including all of said catalyst and none of said activator, the other of said adhesive composition portions including all of said activator and none of said catalyst;

applying to one of said surfaces an effective amount of said one adhesive composition portion;

applying to the other one of said surfaces an effective amount of said other adhesive composition portion, said activator being present in sufficient quantity in said other adhesive composition portion for triggering catalysis and polymerization of said ester and acid monomers; and bringing said surfaces into such proximity that the adhesive composition portion containing said activator contacts the adhesive composition portion containing the catalyst;

thereby activating said catalyst and causing said ester and acid monomers to polymerize and providing said composition with enhanced overall compression shear strength, lap shear strength, peel strength and impact strength adhesive physical properties, whereupon said adhesive composition achieves at least about 80 percent of its ultimate bond strength in from about 6 to 8 hours.

* * * * *